Patented Aug. 31, 1948

2,448,368

UNITED STATES PATENT OFFICE 2,448,368

ORGANIC ACID SYNTHESIS

William F. Gresham and Richard E. Brooks, Wilmington, Del., assignors to E. I. du Pont de Nemours & Company, Wilmington, Del., a corporation of Delaware No Drawing. Application November 19, 1945, Serial No. 629,699

8 Claims. (Cl. 260—533)

This invention relates to the synthesis of organic oxygen-containing compounds and more particularly to the synthesis of organic acids by reaction between organic compounds containing olefinic unsaturation, carbon monoxide and water.

It was known heretofore that organic carboxylic acids could be obtained by reaction between olefines, carbon monoxide and steam in the presence of certain acidic catalysts, such as hydrogen halides or boron fluoride. The previously known processes for the preparation of organic carboxylic acids from olefines, carbon monoxide and steam had the disadvantage that excessive corrosion of the pumps and reaction vessels occurred, which contributed substantially to the cost of producing organic carboxylic acids thereby.

An object of this invention is to provide a process for the synthesis of organic oxygen-containing compounds, especially organic acids, without the use of a catalyst of the type heretofore required. Another object is to provide a novel method for the high-pressure synthesis of organic carboxylic acids in the presence of catalysts which are not excessively corrosive. A still further object is to provide a commercially feasible process for the manufacture of organic carboxylic acids from readily available and very inexpensive starting materials. Other objects and achievements of the invention will appear hereinafter.

These objects are accomplished in accordance with the invention by reacting an organic compound containing non-aromatic olefinic unsaturation with carbon monoxide and water in the presence of a catalyst of the class consisting of nickel and cobalt carbonyls.

In a specific embodiment, and by way of illustration, the invention contemplates the synthesis of propionic acid in accordance with the following equation in the presence of a catalytic quantity of nickel carbonyl:

$$CH_2=CH_2 + H_2O + CO \rightarrow CH_3CH_2COOH$$

In other embodiments the invention comprises reacting an organic compound containing non-aromatic olefinic unsaturation with carbon monoxide and water at elevated temperatures and pressures in the presence of at least one of the aforesaid catalysts, whereby carboxylic acids are produced.

It is possible in the practice of the invention to employ certain catalyst generators, i. e. substances which produce nickel or cobalt carbonyl under the conditions of the reaction. Such substances include metallic nickel, metallic cobalt, and salts, oxides, hydrides, or alloys of nickel or cobalt. These substances react with carbon monoxide at elevated temperatures and pressures in the absence of inorganic acidic substances to form nickel or cobalt carbonyls. The inorganic acids such as the hydrogen halides, inhibit the formation, or cause the decomposition, of the aforesaid carbonyls, and the presence of such acids is therefore to be avoided.

It is therefore generally advantageous to carry out the reaction between olefinic compounds, carbon monoxide and water, in accordance with the invention, in the presence of the nickel or cobalt carbonyl catalyst, and in the absence of any substantial quantity of free inorganic acidic substance, i. e., any inorganic acidic material other than salts of nickel or cobalt, which salts may, of course, have an acidic reaction towards indicators. It is thus frequently desirable to employ catalysts consisting of nickel or cobalt carbonyl as the essential ingredient, in the absence of such inorganic acidic substances as hydrogen halides, phosphoric acid, or boron fluoride.

The unsaturated compounds containing olefinic unsaturation which may be used in accordance with this invention are the olefinic hydrocarbons and other organic compounds containing a (i. e. at least one) non-aromatic double bond between the carbon atoms. Suitable examples of such compounds are the olefinic hydrocarbons themselves, e. g., ethylene, alkyl-substituted ethylenes (such as propylene, butene-2, isobutylene, pentene-1, tetramethyl ethylene, diisobutylene, and cracked gasoline fractions), cyclohexene, butadiene, isoprene, polymerized dienes, rubber, styrene, alpha-methyl styrene, vinyl cyclohexene, pinene, limonene, mixed olefins or olefin fractions obtained by cracking and/or dehydrogenation of petroleum, cyclohexadiene, dicyclopentadiene; unsaturated oxygenated compounds such as allyl alcohol, allyl acetate, allyl ethers, methallyl alcohol, vinyl acetate, furane, methyl methacrylate, methyl acrylate, methallyl propionate, methyl oleate, oleic acid, methyl vinyl ketone, methyl vinyl ether, cyclohexene carboxylic acids, esters of cyclohexene carboxylic acids, methallyl methacrylate, acrolein; and, in general, the unsaturated hydrocarbons, esters, ethers, carboxylic acids, amides, aldehydes, and ketones containing non-benzenoid olefinic unsaturation. It is sometimes desirable to employ polymerization inhibitors with the readily polymerizable reactants.

The amount of catalyst which may be employed in the practice of the invention may be varied widely but is generally about 0.05% to 30% based on the total weight of the reaction mixture. Excellent results are obtained when the nickel or cobalt carbonyl catalyst is introduced as such into the reaction mixture, for this facilitates satisfactory control over the catalyst concentration. If desired, the catalysts may be employed in combination with inert materials or promoters, such as $ThO_2$, Mn, etc.

The reaction is preferably conducted by heating the mixture of organic compound containing olefinic unsaturation, carbon monoxide and water at a temperature above 150° C. in a suitable pressure-resistant vessel in the presence of one of the aforesaid catalysts, which in a preferred embodiment may contain nickel carbonyl as the principal or sole catalytic ingredient. The simple olefins such as ethylene generally do not require as high a pressure as is required by the highly-branched olefins, such as tetramethyl ethylene. In general, however, the pressure should be within the range of about 50 to 3000 atmospheres, or even higher, the maximum pressure being limited only by the strength of the retaining vessel. The simple olefinic hydrocarbons, particularly ethylene, propylene, and isobutylene, may be reacted, according to the invention, very satisfactorily at pressures within the range of about 500 to 1500 atmospheres. Pressures exceeding 1000 atmospheres are frequently required for the highly branched olefinic compounds.

In certain instances, oxygen-containing compounds other than carboxylic acids may be produced in the reaction between olefinic compounds, carbon monoxide and water. When ethylene is employed as the olefinic compound, appreciable quantities of diethyl ketone (the hydrogen consumed in the formation of diethyl ketone probably being formed via the water-gas reaction) may be produced, especially with a cobalt-containing catalyst, although, as set forth in the examples, the yield of carboxylic acid may be as high as 80-90%. When oleic acid is reacted with water and carbon monoxide according to the invention, the reaction yields products which are the result not only of the carboxylation of the olefinic linkage but which contain a relatively large amount of alcoholic hydroxyl derivatives as well.

The reaction between the olefinic compound, carbon monoxide and water may be conducted either batchwise or continuously. When solid catalyst-generators are employed they may be used in the form of a fixed bed or they may be conducted through the reaction vessel along with the reactants. Alternatively, solid catalysts may be employed in a finely divided fluidized state, or they may be suspended in the reaction mixture. The reaction may be conducted either in the liquid or the vapor phase.

The relative proportions of reactants employed may be the stoichiometrically required quantities, although other proportions may be employed if desired. If the amount of water initially present is less than the amount stoichiometrically required for the formation of carboxylic acids, other oxygen-containing products may be formed, as disclosed in greater detail in copending application S. N. 630,540, filed November 23, 1945. It is generally beneficial, in the practice of the invention, to employ from 0.1 to 10 (preferably 0.8 to 2.0) moles of olefinic reactant and 0.1 to 20 (preferably 0.8 to 5.0) moles of carbon monoxide, per mole of water.

If desired any inert liquid may be employed as a reaction medium. However, the reaction may be conducted satisfactorily in the absence of any added medium. Examples of suitable inert organic solvents which may be employed as reaction media are carboxylic acids, dialkyl ethers, dioxane, cyclohexane, xylene, benzene, saturated hydrocarbons and the like. To suppress the water-gas reaction it is frequently preferred to employ carbon dioxide as a diluent.

The invention is illustrated further by means of the following examples.

*Example 1.*—A mixture containing 9 cc. of distilled water, 10 grams of cobalt propionate and 28 grams of ethylene was heated in a pressure resistant vessel at a temperature of 234° to 250° C. under a pressure of 660 to 830 atmospheres of carbon monoxide. The resulting product, which was a dark red liquid, was removed from the reaction vessel and distilled. A 46% conversion to propionic acid and a 14.5% conversion to diethyl ketone was obtained.

*Example 2.*—A mixture containing 9 cc. of water, 10 grams of reduced sintered alkali-free cobalt oxide catalyst, and 28 grams of ethylene was heated for 30 minutes in a pressure resistant vessel at a temperature of 160° to 178° C. under a carbon monoxide pressure of 395 to 410 atmospheres. Since the reaction was relatively slow under these conditions the temperature and pressure were thereafter raised to 220° to 238° C. and 740 to 820 atmospheres. A rapid reaction ensued which gave rise to a product containing a mixture of propionic acid and diethyl ketone.

*Example 3.*—A mixture containing 9 cc. of water, 10 grams of nickel carbonyl, 44 grams of carbon dioxide (to suppress the water-gas reaction) and 28 grams of ethylene was heated for 30 minutes at a temperature of 300° to 375° C. under a carbon monoxide pressure of 450 to 740 atmospheres. Distillation of the resulting product gave 30.3 grams of crude propionic acid which corresponded to a yield of about 80–90%.

*Example 4.*—A mixture containing 9 cc. of water, 10.2 grams of nickel propionate, and 14 grams of ethylene was heated for 62 minutes at a temperature of 288° to 392° C. under a pressure of 375 to 800 atmospheres of carbon monoxide. Distillation of the reaction product gave a small foreshot containing nickel carbonyl and a propionic acid fraction containing 13.2 grams of propionic acid.

*Example 5.*—A mixture containing 9 cc. of water, 10 grams of nickel propionate, 44 grams of carbon dioxide (to suppress the water-gas reaction), 14 grams of ethylene and 37 grams of propionic acid (as a diluent) was heated for 80 minutes at a temperature of 295° to 320° C. under a pressure of 325 to 750 atmospheres of carbon monoxide. The net conversion to propionic acid was 45.4%.

*Example 6.*—A mixture containing 18 cc. of water, 10 grams of nickel carbonyl, 44 grams of carbon dioxide and 42.1 grams of propylene was heated for 1 hour at a temperature of 314° to 334° C. under a pressure of 595 to 765 atmospheres of carbon monoxide. The resulting product contained 67 grams of a pale brown liquid consisting chiefly of normal and isobutyric acids in the proportion of about 2:1. The total conversion to butyric acids was 65% of the theoretical.

*Example 7.*—A mixture containing 56 grams of isobutylene, 10 grams of metallic cobalt, and 9 cc. of water was heated for 2.2 hours at a temperature of 318° to 322° C. under a pressure of 450 to 700 atmospheres of carbon monoxide. Distillation of the resultant product gave a fraction, B. P. 60° to 130° C. at 23 to 24 mm., which was a mixture of isobutylene polymers, and oxygen-containing organic compounds.

*Example 8.*—A mixture (17.1 grams) containing propionic acid, water and nickel carbonyl (mole ratio 0.8:0.2:0.1), simulating a nickel carbonyl-catalyzed propionic acid synthesis product prepared according to the general method illustrated in Example 3, was distilled through a Vigreaux column while carbon monoxide was passed into the contents of the distillation vessel at the rate of about 2 bubbles per second. The distillation gave a foreshot (weight 7.6 grams) having a boiling range of 30° to 51° C. and a higher boiling fraction which contained water and propionic acid (boiling point up to ca. 142° C.). The foreshot contained nickel carbonyl, corresponding to 75–80% recovery. There also was a distillation heel which contained additional quantities of nickel, evidently present as nickel propionate.

In certain instances the nature of the reaction product depends upon the temperature at which the reaction is conducted. High temperatures and pressures may, in many instances, lead to the formation of miscellaneous oxygenated organic compounds rather than to high yields of carboxylic acids. In general, however, it is preferred to operate at a temperature within the range of 150° to 500° C., preferably about 175° to 375° C.

It is generally advantageous to recover the nickel or cobalt carbonyl from the reaction product by distillation under a blanket of carbon monoxide. Thus, it has been observed that in the absence of such an atmosphere of carbon monoxide $Ni(CO)_4$ decomposes in part at temperatures as low as 52° C., but, under a blanket of carbon monoxide at atmospheric pressure, $Ni(CO)_4$ is stable up to about 140° C. The nickel carbonyl recovered by such methods is, of course, suitable for reuse with additional quantities of reactants.

If desired, the reaction between organic olefinic compounds, carbon monoxide and water may be conducted in a continuous manner, and tubular converters may be employed. In the continuous process the reactants and/or catalyst may be introduced at one or more points within the reaction vessel, if desired. In certain instances it is preferred to employ a tubular reaction vessel in which the temperature and pressure are not uniform throughout the length of the vessel.

The reaction vessel employed in the practice of the invention may be made of, or lined with, inert materials such as, glass, porcelain, and the like, if desired. In preferred embodiments the reaction vessel is made of or lined with metals which do not exert an appreciable catalytic effect upon the reaction. Excellent results may be obtained in reaction vessels lined with copper, silver or other similar metals.

The products obtained in accordance with the invention are widely useful per se, and are also valuable as intermediates for the manufacture of alcohols, esters, amides and numerous other organic materials.

Since many embodiments of the invention may be made without departing from the spirit and scope thereof, we do not limit ourselves except as set forth in the following claims.

We claim:

1. A process for the synthesis of organic carboxylic acids which comprises reacting an olefin hydrocarbon having from two to ten carbon atoms per molecule with carbon monoxide and water at a temperature within the range of 175° to 375° C. under a pressure of 500 to 1500 atmospheres in the presence of a metal carbonyl catalyst of the class consisting of nickel and cobalt carbonyls, in the absence of any substantial quantity of free inorganic acidic catalyst, thereafter recovering the metal carbonyl catalyst by direct distillation from the reaction product in an atmosphere of carbon monoxide, and separating organic carboxylic acid from the resulting product.

2. The process of claim 1 in which the said olefin hydrocarbon is ethylene.

3. The process of claim 1 in which the said olefin hydrocarbon is propylene.

4. The process of claim 1 in which the said olefin hydrocarbon is isobutylene.

5. The process of claim 1 in which the quantity of the said catalyst is 0.05% to 30% of the weight of the total reaction mixture.

6. The process of claim 1, in which the reaction between the olefin, carbon monoxide and water is carried out in the presence of carbon dioxide, whereby the water gas reaction is suppressed.

7. A process for the synthesis of organic carboxylic acids which comprises reacting an olefin hydrocarbon having from 2 to 10 carbon atoms per molecule with carbon monoxide and water at a temperature of 150° to 500° C. under a pressure within the range of 50 to 3000 atmospheres in a pressure-reactant reaction vessel in the presence of a metal carbonyl catalyst of the class consisting of nickel and cobalt carbonyls, in the absence of any substantial quantity of free inorganic acidic catalyst, withdrawing from the said reaction vessel a reaction product containing the said metal carbonyl catalyst, and thereafter separating organic carboxylic acid by distillation of the said product.

8. A process for the synthesis of propionic acid which comprises introducing ethylene, carbon monoxide, water, and a metal propionate of the class consisting of nickel propionate and cobalt propionate into a reaction vessel, heating the resulting mixture in the absence of any substantial quantity of free inorganic acidic catalyst at a temperature of 150° to 500° C. under a pressure of 50 to 3000 atmospheres whereby a metal carbonyl catalyst of the class consisting of nickel and cobalt carbonyls is formed in situ from the said metal propionate by reaction with carbon monoxide, and propionic acid is formed from the said ethylene, carbon monoxide and water, and thereafter separating the said propionic acid from the resulting mixture.

WILLIAM F. GRESHAM.
RICHARD E. BROOKS.

REFERENCES CITED

The following references are of record in the file of this patent:

UNITED STATES PATENTS

| Number | Name | Date |
|---|---|---|
| 1,924,763 | Carpenter | Aug. 29, 1933 |
| 1,957,939 | Carpenter | May 8, 1934 |
| 2,000,053 | Vail | May 7, 1935 |
| 2,079,216 | Laison | May 4, 1937 |
| 2,135,459 | Loder | Nov. 1, 1938 |

FOREIGN PATENTS

| Number | Country | Date |
|---|---|---|
| 335,551 | Great Britain | Sept. 23, 1930 |

OTHER REFERENCES

Heiber et al., Chem. Abstracts, vol. 37, column 3684 (1943). (Copy in Scientific Library.)